Oct. 19, 1948.  H. K. WEED  2,451,894
STEEL REINFORCED TIRE
Filed June 27, 1946

INVENTOR.
Hallis K. Weed
BY Victor J. Evans & Co.
ATTORNEYS

Patented Oct. 19, 1948

2,451,894

UNITED STATES PATENT OFFICE 2,451,894

STEEL REINFORCED TIRE

Hollis K. Weed, Blakeley Island, Ala.

Application June 27, 1946, Serial No. 679,647

1 Claim. (Cl. 152—284)

This invention relates to a filler for a rubber tire casing that is made of spring steel wire formed in continuous circles to fit the inner walls of the casing, and joined by related spaced coils of wire which under expansion serve to hold the tire casing in full extended position.

An object of the invention is to provide a filler that is adapted to replace the conventional rubber inner tube for tire casings, that is puncture proof, durable, and will as efficiently support the casing in extended position, as the tube it is designed to replace.

With the above and other objects and advantages in view, the invention consists of the novel details of construction, arrangement and combination of parts more fully hereinafter described, claimed and illustrated in the accompanying drawing in which:

Figure 1:
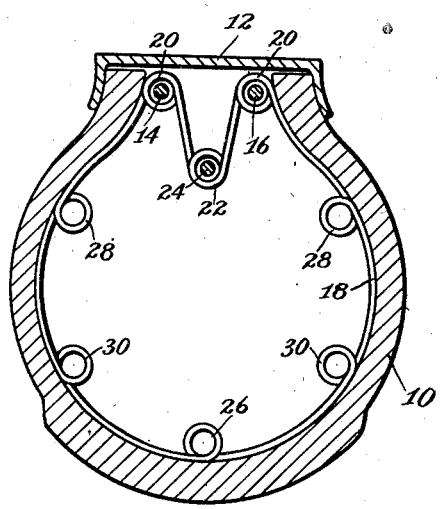
Figure 1 is a transverse sectional view of an embodiment of the invention on the line 1—1 of Figure 3 with the rim in position on the tire casing.
Figure 2:
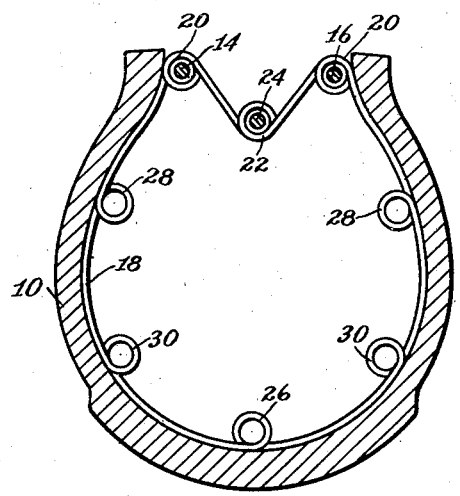
Figure 2 is the same, with the rim removed.
Figure 3:
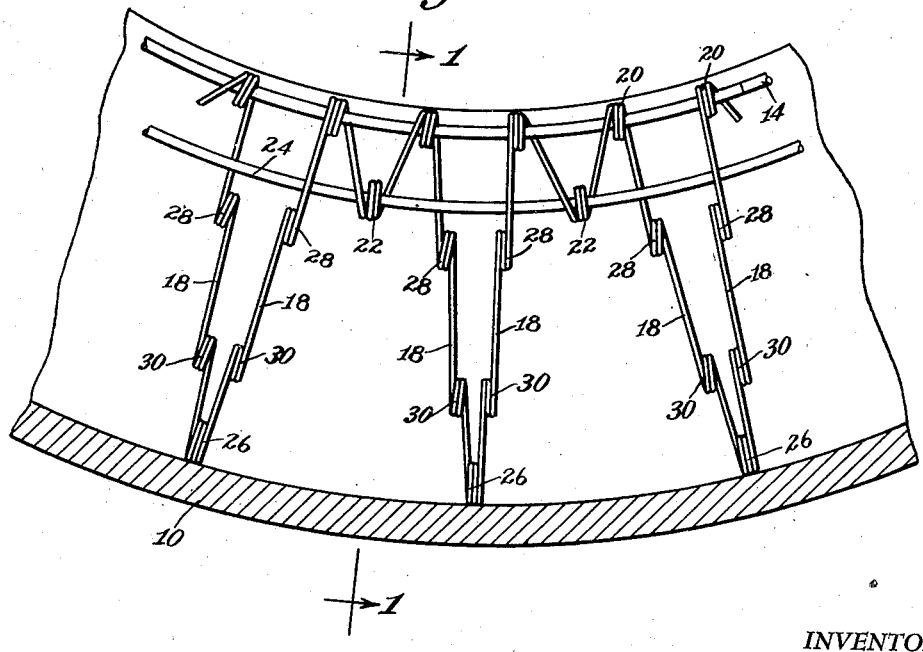
Figure 3 is a sectional sector view of the invention in position in the casing.

Referring more in detail to the drawing, the reference numeral 10 designates a rubber tire casing and 12 the rim for the mounting thereof on a motor vehicle wheel, or it may be the wheel itself.

The invention comprises the cables 14 and 16 which extend circumferentially of the rim 12 and serve to retain the casing thereon.

The filler comprises a series of relatively spaced expansion members 18 which are formed from a continuous piece or strand of wire having the coils 20 secured to the cables 14 and 16. Intermediate the coils 20 are formed the expansion coils 22 which also have a cable 24 passing therethrough, and the cable extends circumferentially of the rim 12 inwardly of the cables 14 and 16. The similarly shaped members 18 form an annular tubular body and at the vertex thereof are provided the tread coils 26 which serve to support the tread of the casing. Intermediate the coils 20 and 26 in parallel relation to each other in the body formed by the members 18 and opposed with relation to the cross section of the casing 10 are the shoulder coils 28 and side wall coils 30.

The coils are all formed of two full turns, and serve to function as the air within the conventional inner tube. The filler is inserted in the casing, and when compressed under pressure to permit the mounting of the casing on the rim, will serve to remain in such a position to support the casing until it is worn out.

The number of coils depend on the size of tire with which the the filler is to be used, more coils being used with large size tire casings and the weight of the wire may also be increased accordingly. All ends are welded together, and the fillers are made to conform to the size of the casing.

There has thus been provided a filler that is puncture proof and blow-out proof, will provide a safe, easy ride and will stand shock and strain to a greater degree than the conventional inner tube.

It is believed that from the foregoing description the structure and operation of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A filler for casings of motor vehicle tires comprising a pair of cables positioned around the inner surfaces of the walls of a tire and spaced from the open inner side thereof, coil springs positioned in a centrally disposed plane midway between the cables and extended inwardly into the casing, said coil springs having outwardly extending arms connected to the cables and urging the cables apart, and circular wire strands with spaced coils therein extending from the cables around the inner surface of the casing.

HOLLIS K. WEED.

REFERENCES CITED

The following references are of record in the file of this patent:

UNITED STATES PATENTS

| Number | Name | Date |
|---|---|---|
| 524,272 | Beebe | Aug. 7, 1894 |
| 633,685 | Conatser | Sept. 26, 1899 |
| 855,468 | Midgley | June 4, 1907 |
| 1,001,348 | Burgess et al. | Aug. 22, 1911 |

OTHER REFERENCES

A. P. C. Application of A. R. E. A. Perreau 456,846. Published: June 15, 1943.